(12) United States Patent
Yang

(10) Patent No.: US 7,612,945 B2
(45) Date of Patent: Nov. 3, 2009

(54) PYRAMIDAL MICROLENS AND CAMERA LENS STRUCTURE USING THE SAME

(75) Inventor: Chih-Yi Yang, Taipei (TW)

(73) Assignee: Lumos Technology Co. Ltd., Taipei (TW)

( * ) Notice: Subject to any disclaimer, the term of this patent is extended or adjusted under 35 U.S.C. 154(b) by 96 days.

(21) Appl. No.: 11/874,411

(22) Filed: Oct. 18, 2007

(65) Prior Publication Data

US 2008/0137210 A1 Jun. 12, 2008

(30) Foreign Application Priority Data

Dec. 11, 2006 (TW) .............................. 95221802 U

(51) Int. Cl.
G02B 3/00 (2006.01)
G02B 3/02 (2006.01)
G02B 7/02 (2006.01)

(52) U.S. Cl. ........................ 359/642; 359/720; 359/811

(58) Field of Classification Search ............. 356/240.1, 356/241.1, 241.5; 359/642, 720, 800, 808, 359/811; 362/327, 332, 244, 245; 382/145, 382/147, 149, 152
See application file for complete search history.

(56) References Cited

U.S. PATENT DOCUMENTS

| 1,912,156 | A | * | 5/1933 | Owens | 369/112.23 |
| 2,521,558 | A | * | 9/1950 | Alvarez | 40/725 |
| 4,712,916 | A | * | 12/1987 | Gunn | 356/241.1 |
| 5,216,485 | A | * | 6/1993 | Bird et al. | 356/394 |
| 5,839,823 | A | * | 11/1998 | Hou et al. | 362/327 |
| 6,697,154 | B2 | * | 2/2004 | Owen et al. | 356/237.5 |
| 7,245,435 | B2 | * | 7/2007 | Morishita et al. | 359/619 |
| 7,372,632 | B2 | * | 5/2008 | Lizotte | 359/626 |
| 7,390,117 | B2 | * | 6/2008 | Leatherdale et al. | 362/555 |
| 2006/0091784 | A1 | * | 5/2006 | Conner et al. | 313/498 |
| 2008/0144921 | A1 | * | 6/2008 | Lizotte et al. | 382/145 |
| 2009/0180019 | A1 | * | 7/2009 | Yang | 348/335 |

FOREIGN PATENT DOCUMENTS

CN 201037874 Y * 3/2008

* cited by examiner

*Primary Examiner*—David N Spector
(74) *Attorney, Agent, or Firm*—Chun-Ming Shih

(57) ABSTRACT

In a microlens for observing a microstructure and a camera lens structure using the microlens, the microlens includes a frustum formed on a substrate. The frustum is placed to the observed hole of the microstructure, such that a user's naked eye may approach the substrate to observe a locally enlarging image of the inner surface of the hole. In addition, the microlens is able to be placed longitudinally in a hollow lens tube of a camera lens structure, which may be placed on a surface, such that the microlens may be used at any surface.

15 Claims, 5 Drawing Sheets

PYRAMIDAL MICROLENS AND CAMERA LENS STRUCTURE USING THE SAME

BACKGROUND OF THE INVENTION

1. Field of the Invention

The present invention generally relates to a lens, in particular, to a microlens having magnifying function.

2. Description of Prior Art

Under the lead of a thriving technical industry, it is able to establish a substantially solid experience and technique for semiconductor in terms of design, simulation, process, packaging, and test, which have a significant advantage for developing MEMS (micro-electro-mechanical system) hereafter. Nowadays, the development of each electronic product has a trend in pursuing the goals of lightness, thinness, shortness, and smallness, so there is an amazing speed in changing the outlook of many electronic products, for example, the design of electronic hardware, computer or microprocessor.

To cope with the developing direction of electronic product in the designing trends of lightness, thinness, shortness, and smallness, the size of each electronic element is continuously microminiaturized. So far, the size of electronic element has broken the limitation that may be directly observed by human naked eye, even a deep-submicron state having reached already.

Based upon the microminiaturizing development of element size, a totally different difficulty is further emerging on the integrating level of microstructure. Since element size is moved toward a standard beyond the level of deep-submicron, even aerosol particle easily ignored in the past will become a critical factor in today by influencing the element yield. Later on, in order to promote the element yield, clean room is established to remove the influence of this impurity in the air, thereby the aforementioned influence being effectively improved and removed.

Although the establish of aforementioned clean room has removed the influence of the aerosol particle in the air to effectively promote element yield, however, the influence of yield not only comes from the impurity in air, but also originates from the process of facilities and elements themselves. In a clean room, each facility has its own usage lifetime, so before the usage lifetime it will be worn out to generate fissure, which easily releases micro-particle formed as dust that is unable to be observed by human naked eye. If dust invades element itself during process, for example, invading into a hole of a circuit board, then it is difficult to find out an occurrence of a defect during element integration. Furthermore, during a processing procedure of PCB (printed circuit board), a through hole on the PCB is acted as a pathway for an electric connection between copper foils arranged on two plate surfaces. Wherein, conductive metal is plated on the inner surface of the through hole, such that an electric connection is created between the copper foils arranged on the two plate surfaces. If it is impossible to connect the conductive metal plated on the internal surface of the through hole, then it will directly influence the electric connection between two plates of the PCB.

Currently, although micro-technique has developed into an observing dimension above nano-level because of the need of technology, a solution for above problem has not yet developed. In other words, a defect of an electronic product still can not be detected immediately following the movement of an inspector, which becomes a problem needed to be solved urgently by current electronic industry during the effort to pursue high yield and high efficiency.

SUMMARY OF THE INVENTION

The invention is mainly to provide a microlens capable of observing microstructure instantly and a camera lens structure using the microlens. Product yield and working efficiency can be maintained by designing the microlens structure with magnification, which can inspect microstructure instantly. In addition, an image recording device is coped to simultaneously shoot the image, thereby, the yield and the working efficiency being maintained.

The invention is to provide a microlens and a camera lens structure using the microlens. The microlens is capable of observing a hole of the microstructure and includes a frustum formed on a substrate. The substrate has a transparent surface. Light beam, entering the lens through the frustum, is reflected several times in the lens to generate dispersion, later on, the dispersed light penetrating through the transparent surface to form a magnified image on the user's retina or on an image recording device, thereby, the user being able to observe the corresponding microstructure instantly through the lens.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, being not used to limit its executing scope. Any equivalent variation and modification made according to appended claims is all covered by the claims claimed by the present invention.

Figure 1:
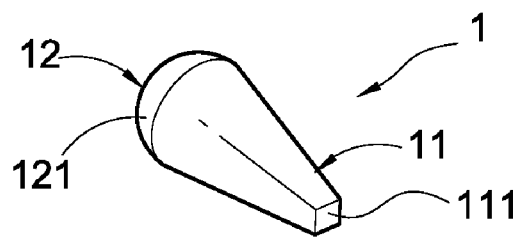
FIG. 1 is a perspective, structural view of a microlens of the present invention.
Figure 2:
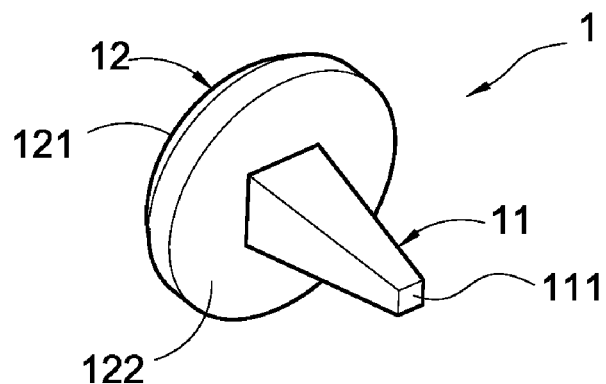
FIG. 2 is a perspective, structural view of a microlens according to the first embodiment of the present invention.
Figure 3:
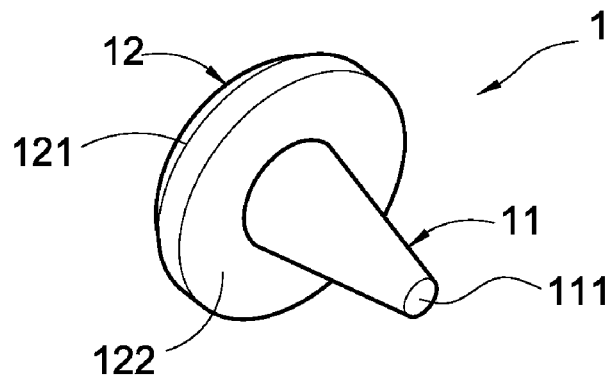
FIG. 3 is a perspective, structural view of a microlens according to the second embodiment of the present invention.

Please refer to FIG. 1 to FIG. 3, which respectively are a perspective, structural view of a microlens of the present invention, a perspective, structural view of a microlens according to the first embodiment of the present invention, and a perspective, structural view of a microlens according to the second embodiment of the present invention. As shown in these figures, the microlens 1 of the invention has a frustum 11 and a substrate 12, wherein the frustum 11 is formed on the substrate 12. In this case, the frustum 11 of the microlens 1 has a rectangular plane 111 in corresponding to an object to be observed (not shown in the figures, and which will be explained later), such that the light, reflected or refracted from the observed object, may enter the microlens 1 through the top side and the circumferential sides of the frustum 11. The light penetrates through the substrate 12 of the microlens 1, after being reflected many times in the frustum 11 of the microlens 1. Furthermore, the substrate 12 of the microlens 1 has a transparent surface 121. The outer appearance of the transparent surface 121 is shown as an arc-curved surface, which may be a spherical surface or a non-spherical surface. In this case, the transparent surface 121 is a spherical surface, the area of which is substantially larger than that of the plane 111. Thereby, the light, reflected many times, penetrates through the transparent surface 12 to generate a dispersing phenomenon, making a user received the emitting-out light, which finally is formed an enlarging image on the user's retina to facilitate the user in observing the microstructure of the observed object.

Continuously, please refer to FIG. 2 and FIG. 3. A circular plane surface 122 of the substrate 12 is extended outwardly in radial direction, such that the outer diameter of the substrate 12 is larger than that of the base plane of the frustum 11. The transparent surface 121 is shown as a smaller segment of a sphere. In addition, the frustum 11 of the microlens 11 may be shown as a frustum of a pyramid in FIG. 2, or a frustum of a cone in FIG. 3.

Figure 4:
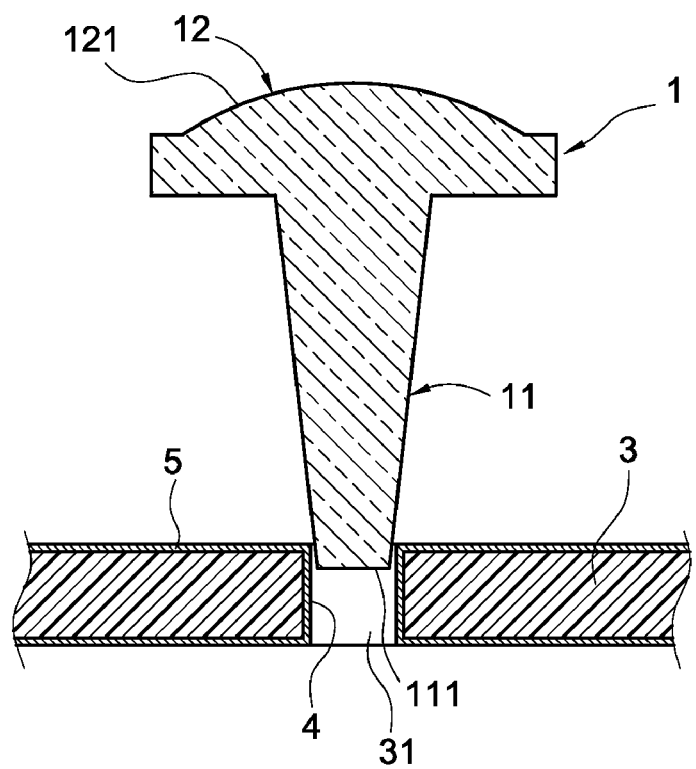
FIG. 4 is an operational, sectional illustration of the present invention.
Figure 5:
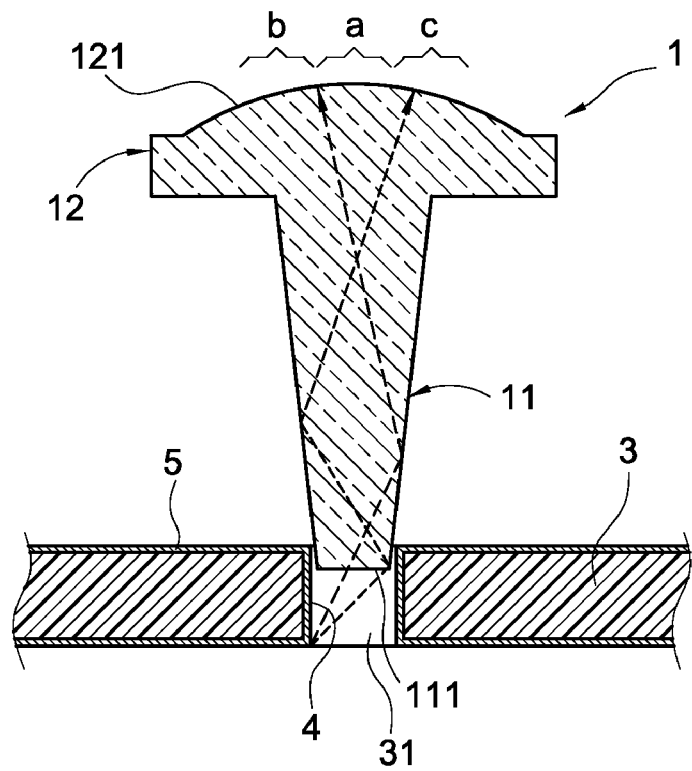
FIG. 5 is a perspective, assembled view illustrating the imaging principle of the present invention.
Figure 6:
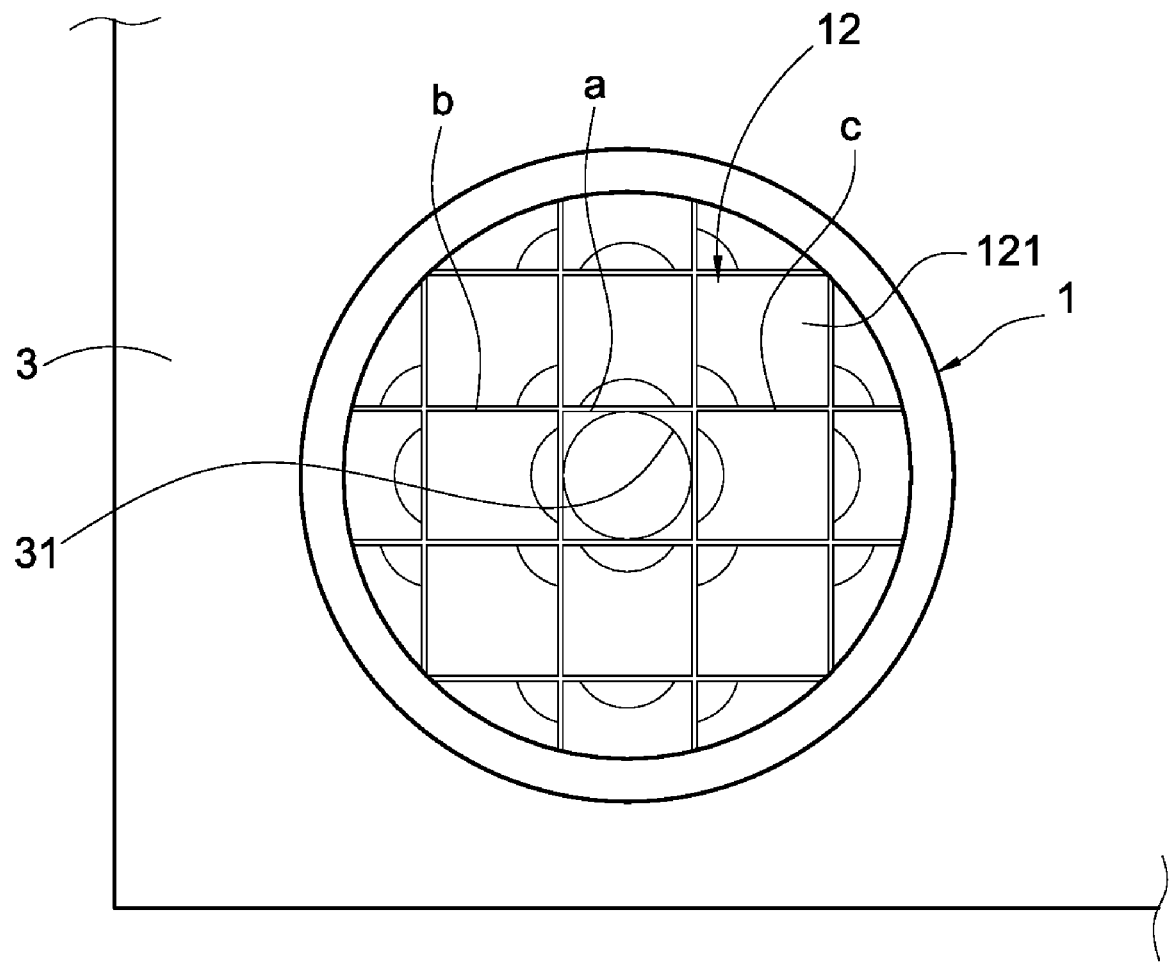
FIG. 6 is a perspective, sectional view illustrating the imaging process of the present invention.

Please refer to FIG. 4 to FIG. 6, which respectively are an operational, sectional illustration, an imaging principle view, and an imaging illustration of the present invention. As shown in these figures, when a user is intended to use the microlens 1 to observe a microstructure, for example, a through hole 31 of a PCB 3 in this embodiment, the frustum 11 of the microlens 1 is placed to the through hole 31 to observe the completeness of the conductive metal layer 4 plated on the inner surface of the through hole 31 and to ensure that the conductive, metallic layer 4 is connected to the copper foil layers 5 respectively arranged on the two plate surfaces. The light reflected or refracted from the conductive, metallic layer 4 in the through hole 31 enters the microlens 1 through the top side and the circumferential sides of the frustum 11. After a plurality of reflecting operations, as simulated by the light reflecting paths in FIG. 5, the light penetrates through the transparent surface 121, as indicated by the arrows in the figure, making light generate dispersing operation to have an image-magnifying effect.

Therefore, when the user receives the light emitting out the lens 1 through the transparent surface 121, a locally enlarged image of the conductive, metallic layer 4 in the through hole 31 is formed on the retina of the user, as shown by the imaging illustration in FIG. 6. As for the frustum 11 of the pyramid, the final image observed by the user is divided into four different blocks. Besides, since of the differences of the paths and the times of light reflection, except for the imaging zone "a" indicated in FIG. 5 and FIG. 6, where the image is identical to the observed object, because the rectangular plane 111 of the frustum 11 corresponds the position of the through hole 31 exactly to that of the axial center, the internal images, of the through hole 31, at outer surrounding of the axial center is shown an upside down and reverse relationship for both of the enlarged image and the real appearance of the conductive, metallic layer 4, as indicated by the imaging zones "b" or "c" of FIG. 5 and FIG. 6.

Figure 7:
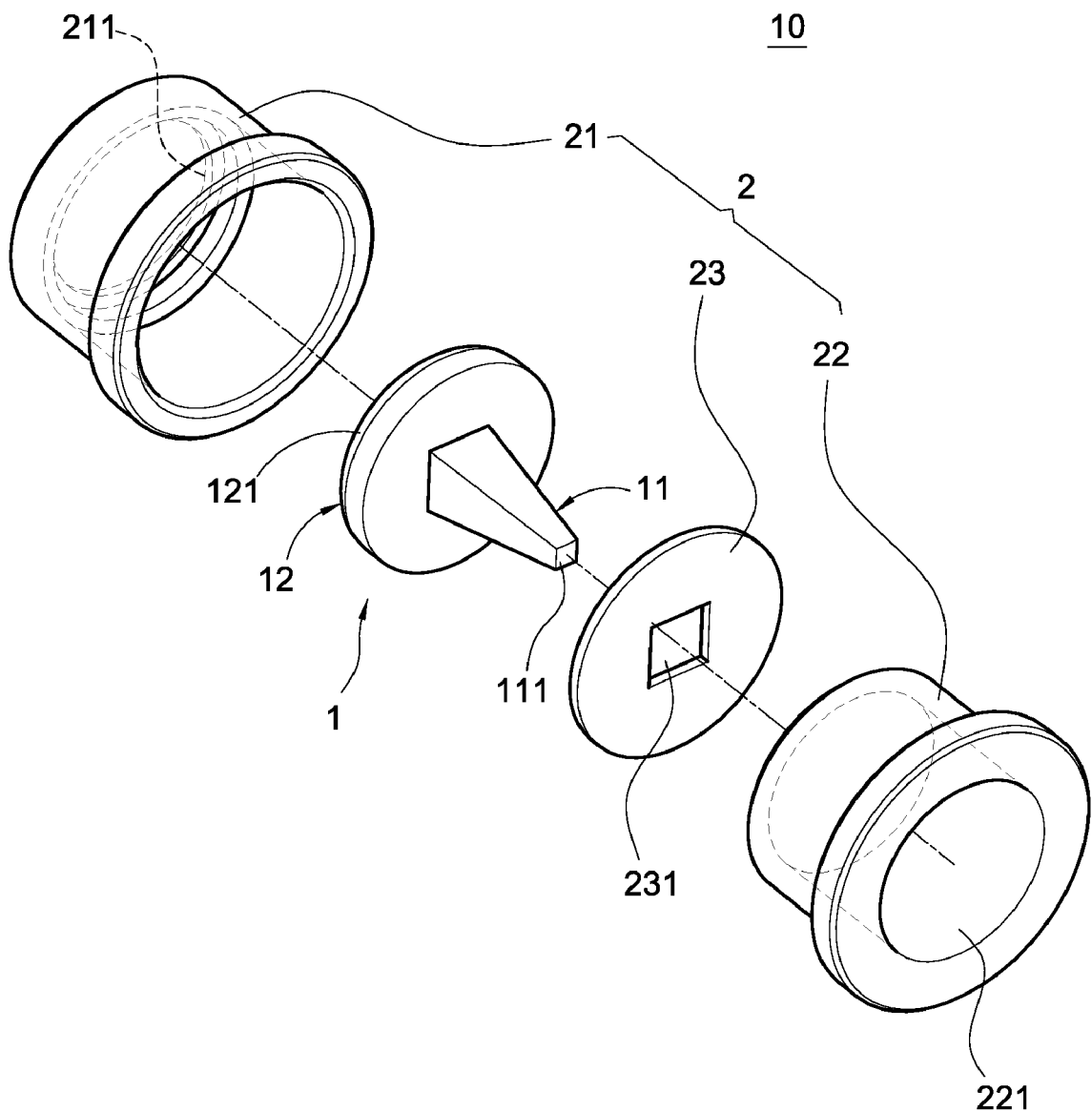
FIG. 7 is a perspective view explosively illustrating the structure of a camera lens of the present invention.
Figure 8:
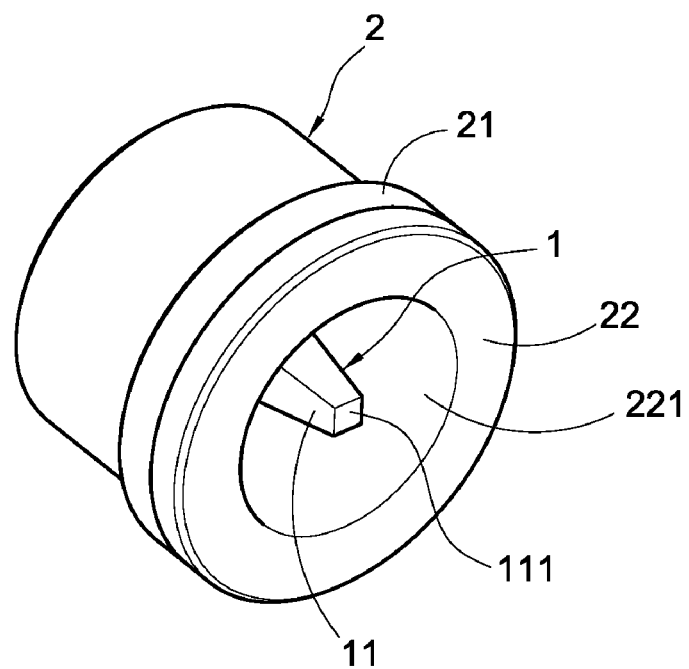
FIG. 8 is a perspective, assembled illustration of a camera lens of the present invention.

Please refer to FIG. 7 and FIG. 8, which respectively are a structurally perspective, explosive view and an assembled illustration of a camera lens of the present invention. As shown in these two figures, the camera lens 10 mainly includes a microlens 1 and a lens tube 2, wherein the microlens 1 is accommodated in the lens tube 2. In this case, the microlens 1 has a frustum 11 of a pyramid. The lens tube 2 further includes an upper lens tube 21, a lower lens tube 22 and a supporting seat 23, wherein the upper lens tube 21 is fitted correspondingly with the lower lens tube 22. The top side of the upper lens tube 21 has a viewing opening 211, while the bottom side of the lower lens tube 22 has an objective opening 221 corresponding to the viewing opening 211. In addition, the supporting seat 23 is a circular plate arranged in the lens tube 2. The circumference of the lower side of the supporting seat 23 is attached to the upper circumference of the lower lens tube 22, as shown in FIG. 6. A through hole 231 is arranged at an axially central position of the supporting seat 23 for the frustum 11 of the microlens 1 to be arranged through, making the bottom of the substrate 12 of the microlens 1 be able to be abutted against the upper side of the supporting seat 23, thereby, the frustum 11 being suspended in the lower lens tube 22. In the meantime, the plane 111 of the frustum 11 is parallel to the objective opening 221, as shown by the operational, sectional view of FIG. 9. At last, after the upper lens tube 21 has been interconnected to the lower lens tube 22, the inner edge of the top part of the upper lens tube 21 may just be abutted against the circumferences of the supporting seat 23 and the hemisphere 12 for securing the supporting seat 23 and the microlens 1, in the meantime, making the transparent surface 121 at the top of microlens 1 in line with the viewing opening 211 of the upper lens tube 21. The assembled, structural view is shown in FIG. 8.

Figure 9:
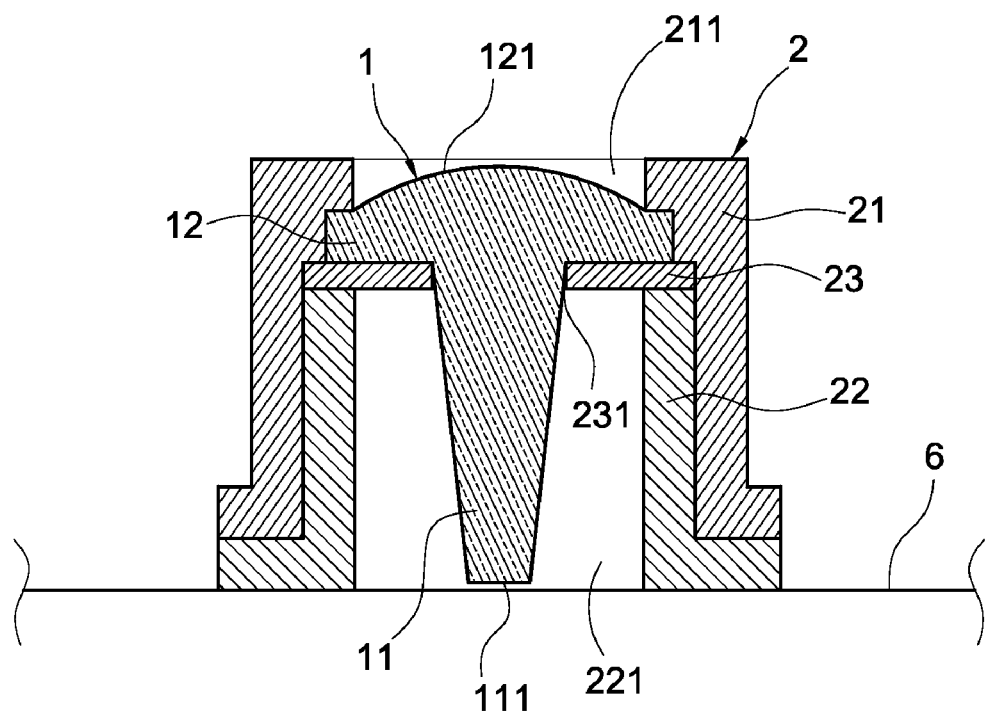
FIG. 9 is an operational, sectional view of a camera lens of the present invention.

Please refer to FIG. 9, which is an operational, sectional view of a microlens of the present invention. As shown in this figure, the microlens 1 is accommodated in the lens tube 2, making the microlens 1 generate a suspending operation and making the viewing opening 211 arranged on the lens tube 2 abutted on the plane and corresponded to an observing position, while the microlens 1 may be used at any position. As shown by the plane plate 6 in the figure, a user may inspect any micro fissure possibly emerging on the plate 6 by means of the objective opening 221 on the lens tube 2 and through the microlens 1, thereby, a problem being able to be detected instantly. In addition, the camera lens 10 may be assembled together with an image recording device, for example, a digital camera, which may directly shoot the image shown by the lens for facilitating a recording purpose.

However, the aforementioned description is only a preferable embodiment according to the present invention, being not used to limit the patent scope of the invention, so equivalently structural variation made to the contents of the present invention, for example, description and drawings, is all covered by the claims claimed thereinafter.

What is claimed is:

1. A microlens having magnifying function for observing a microstructure, comprising:
    a substrate having a plane surface and an arc-curved surface opposite to each other; and
    a frustum formed on the substrate with a base plane thereof being disposed on the circular plane surface,
    thereby light beams, reflected or refracted from an observed object of the microstructure, enters through the frustum for reflection in many times and penetrates through the substrate to generate a magnified image of the observed object for observation.

2. The microlens according to claim 1, wherein the frustum is a frustum of a cone.

3. The microlens according to claim 1, wherein the frustum is a frustum of a pyramid.

4. The microlens according to claim 1, wherein the arc-curved surface is a semispherical surface.

5. The microlens according to claim 1, wherein the arc-curved surface is a non-spherical surface.

6. The microlens according to claim 1, wherein an outer diameter of the plane surface is larger than that of the base plane.

7. A camera lens structure having a microlens with magnification for observing a microstructure, comprising:
   a lens tube, two sides of which respectively have a viewing opening and an objective opening corresponding to the viewing opening; and
   a microlens, which is accommodated in the lens tube and has a frustum formed on a substrate, the frustum having a top plane corresponding to the objective opening and a base plane disposed on a plane surface of the substrate, and the substrate having an arc-curved surface which is opposite to the plane surface corresponding to the viewing opening.

8. The camera lens structure having a microlens according to claim 7, the lens tube further including:
   an upper lens tube, on which the viewing opening is located;
   a lower lens tube, which is inter-fitted with the upper lens tube, and on which the objective opening is located; and
   a supporting seat, which is arranged between the upper lens tube and the lower lens tube for supporting the microlens, and an axially central position of which has a through hole for the frustum to be arranged through and suspended in the lower lens tube.

9. The camera lens structure having a microlens according to claim 7, wherein the frustum is a frustum of a cone.

10. The camera lens structure having a microlens according to claim 7, wherein the frustum is a frustum of a pyramid.

11. The camera lens structure having a microlens according to claim 7, wherein the arc-curved surface is a smaller segment of a spherical surface.

12. The camera lens structure having a microlens according to claim 7, wherein the arc-curved surface is a non-spherical surface.

13. The camera lens structure having a microlens according to claim 7, wherein an outer diameter of the plane surface is larger than that of the base plane.

14. The camera lens structure having a microlens according to claim 7, the camera lens being arranged in an image recording device.

15. The camera lens structure having a microlens according to claim 14, wherein the image recording device is a digital camera.

* * * * *